Sept. 10, 1968  C. JONES  3,400,604
ROTOR AND GEAR ASSEMBLY FOR ROTARY MECHANISMS
Filed Nov. 25, 1966  5 Sheets-Sheet 2

INVENTOR.
CHARLES JONES
BY *William V. Els*
ATTORNEY

Sept. 10, 1968  C. JONES  3,400,604
ROTOR AND GEAR ASSEMBLY FOR ROTARY MECHANISMS
Filed Nov. 25, 1966  5 Sheets-Sheet 3

INVENTOR.
CHARLES JONES
BY *William V. Eli*
ATTORNEY

Sept. 10, 1968   C. JONES   3,400,604
ROTOR AND GEAR ASSEMBLY FOR ROTARY MECHANISMS
Filed Nov. 25, 1966   5 Sheets-Sheet 4

INVENTOR.
CHARLES JONES
BY William V. Obs
ATTORNEY

Sept. 10, 1968 C. JONES 3,400,604
ROTOR AND GEAR ASSEMBLY FOR ROTARY MECHANISMS
Filed Nov. 25, 1966 5 Sheets-Sheet 5
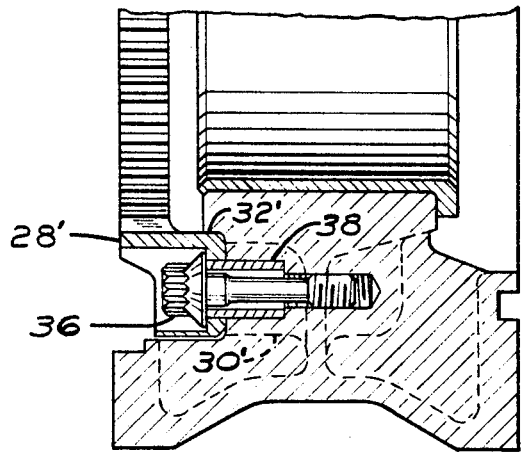
FIG_6
INVENTOR.
CHARLES JONES
BY *William V. Ebs*
ATTORNEY 3,400,604
ROTOR AND GEAR ASSEMBLY FOR
ROTARY MECHANISMS
Charles Jones, Hillsdale, N.J., assignor to Curtiss-Wright
Corporation, a corporation of Delaware
Filed Nov. 25, 1966, Ser. No. 596,845
9 Claims. (Cl. 74—433)

ABSTRACT OF THE DISCLOSURE

A rotor and gear for use in a rotary mechanism, especially a rotary combustion engine, are assembled to minimize stresses produced in an operating mechanism in the gear and in rotor and gear fastening means by securing the gear and rotor against relative radial movement due to thermal distortion at only a sufficient number of locations to assure concentricity of the parts, and by piloting the gear on the rotor with a clearance between the gear and rotor such that at operating temperatures, a tight fit is established between the surfaces of the gear and rotor and cyclic operating loads are transmitted across such surfaces.

Summary of the invention

The invention relates to rotary mechanisms for fluid pumps, fluid motors, combustion engines or the like. More particularly, the invention is directed to a rotor and gear assembly for such rotary mechanisms.

Heretofore, rotors and timing gears for rotary internal combustion engines have been assembled with bolts and pins at numerous locations about the rotor and gear. Failures have resulted with the conventional construction, however, due to thermal distortion of the rotor and the stresses thereby produced in the bolts, pins, and gear over and above cyclically varying stresses to which these parts are also subjected. In accordance with the invention, stresses are relieved on these parts by limiting the points at which thermal distortion may occur and by piloting the gear on the rotor such that at elevated temperatures, a tight fit is established between the gear and rotor whereby load is transmitted across the contacting piloting surfaces.

It is an object of the invention to provide an improved rotor and gear construction for rotary mechanisms.

It is another object of the invention to prevent damage to rotor attached gears and fasteners in rotary mechanisms at elevated temperatures.

It is still another object of the invention to provide an improved light-weight simply-constructed rotor and gear assembly for rotary mechanisms.

It is yet another object of the invention to reduce the number of fasteners required for assembling gears and rotors in rotary mechanisms.

Other objects and advantages of the invention will become apparent while reading the specification in connection with the accompanying drawings.

Description of the views of the drawings

FIG. 6 is an enlarged fragmentary sectional view taken on the plane of the line 6—6 of FIG. 5.

Detailed description

Figure 1:
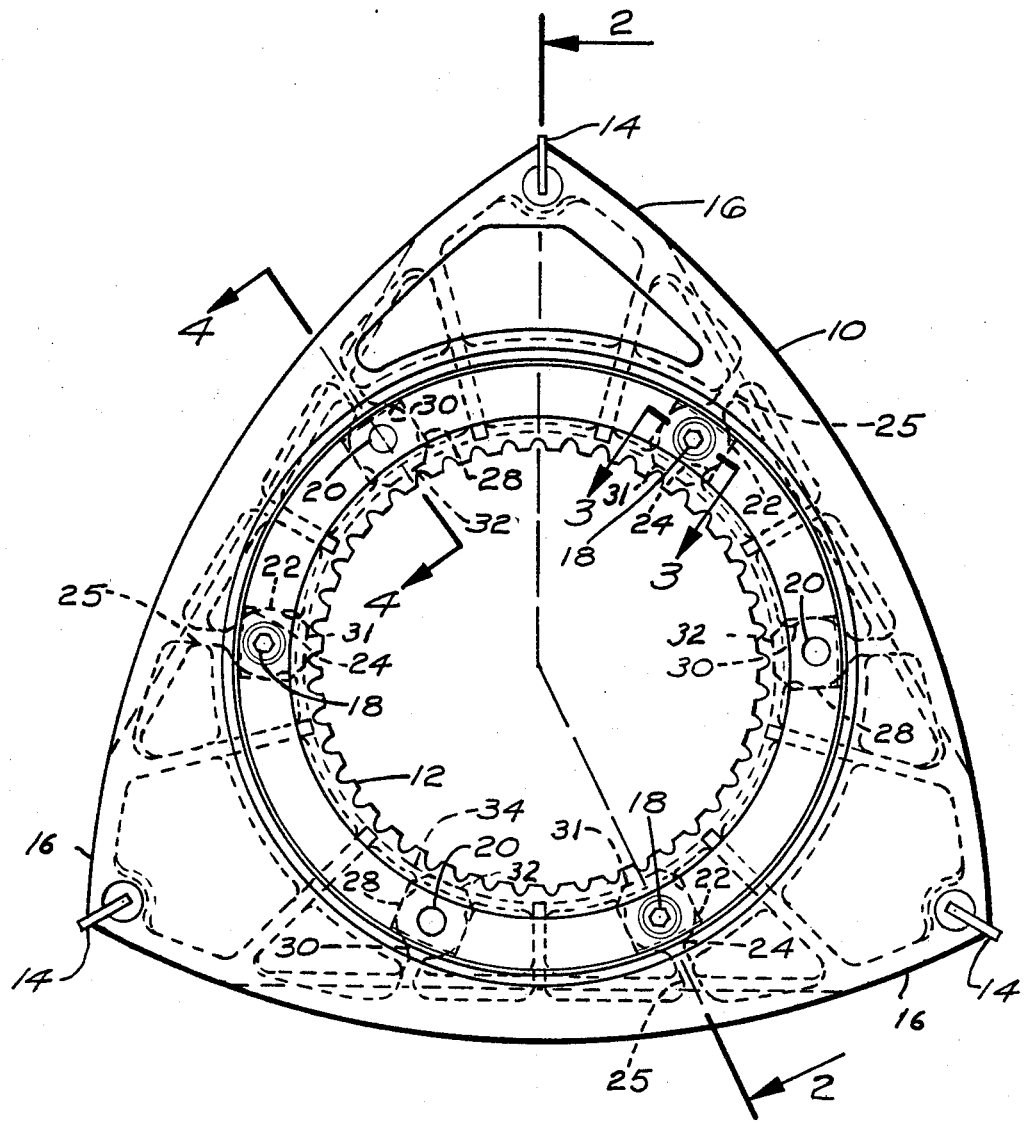
FIG. 1 is an end view of a rotor and gear assembly constructed in accordance with the invention.
Figure 2:
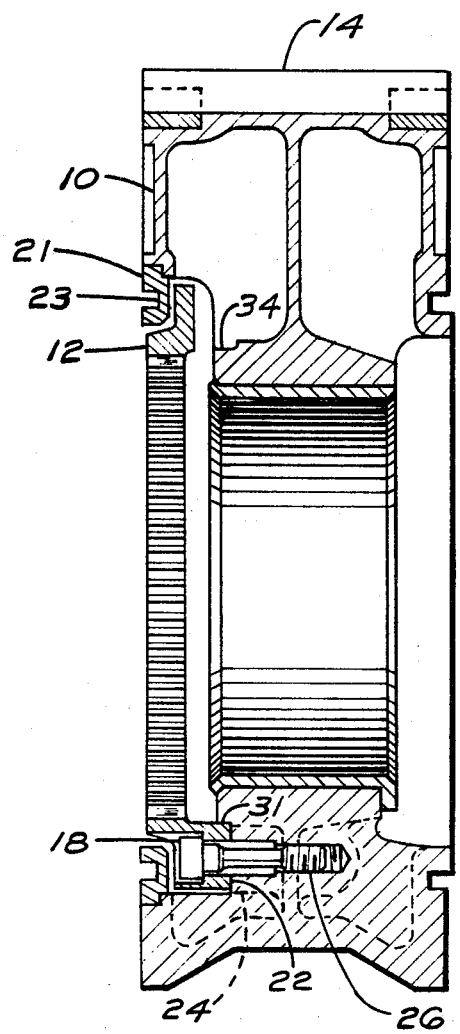
FIG. 2 is a sectional view taken on the plane of the line 2—2 of FIG. 1.
Figure 3:
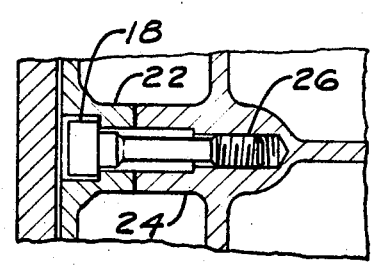
FIG. 3 is an enlarged fragmentary sectional view taken on the plane of the line 3—3 of FIG. 1.
Figure 4:
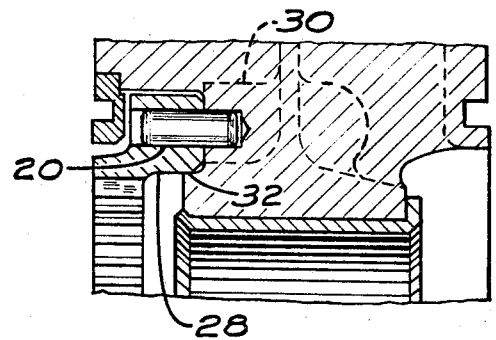
FIG. 4 is an enlarged fragmentary sectional view taken on the plane of the line 4—4 of FIG. 1.

Referring to FIGS. 1 through 4 of the drawings, reference character 10 designates a rotor for a rotary combustion engine of the type disclosed, for example, in Patent No. 2,988,065 for Rotary Internal Combustion Engine issued June 13, 1961. The rotor is assembled to a gear 12 which is provided to index the rotor in its operation in the engine. Although the gear is not provided to transmit power, the gear is nevertheless subjected to cyclically varying loads in an operating engine due to frictional drag on the sealing elements 14 located in the rotor apex portions 16, acceleration and deceleration of the rotor relative to the main shaft of the engine, gear backlash, and movement of the rotor across bearing clearances.

The rotor 10 and gear 12 are assembled in accordance with the invention to prevent failures of the type heretofore experienced in rotor and gear assemblies due to a combination of such cyclically varying loads and thermally induced stresses. As shown, the rotor 10 and gear 12 are assembled by means of bolts 18 which are equally spaced apart around the gear and rotor, and by pins 20 which are located between the bolts and are also equally spaced apart around the gear and rotor. The bolts are provided to secure the gear against axial movement with respect to the rotor, and the pins are provided to secure the gear and rotor against any relative movement in planes perpendicular to the axis of the rotor. A ring 21 (shown in FIG. 2 but omitted from FIG. 1) which is grooved at 23 to hold an end seal may be tightly fitted into the rotor over the gear 12 as indicated, or the gear may be formed with a grooved seal-holding ring as an integral part thereof.

The bolts 18 extend through bosses 22 formed on gear 12 and screw into aligned bosses 24 formed on ribs 25 of the rotor 10 as at 26 to hold the gear against the rotor. Pins 20 extend into bosses 28 on the gear and aligned bosses 30 formed on the ribs of the rotor. A tight fit is provided for the pins 20 in the bosses 28 and 30 so that any thermal distortion of the rotor in planes perpendicular to the rotor axis at elevated temperatures is imparted to the gear 12 at the equiangularly disposed positions of the pins to maintain the gear substantially concentric with the rotor. A loose fit, however, is provided for the bolts 18 in the bosses 22 of the gear so that thermal distortion is not imparted by the rotor to the gear at the locations of the bolts. Also the bolts are tightened in place with a torque which while sufficient to affix the axial position of the gear with respect to the rotor is not so great as to significantly interfere with thermal expansion of the rotor relative to the gear at the bolts.

It is an important feature of the assembly that the gear 12 and rotor 10 are secured against relative movement in planes perpendicular to the rotor and gear axes at only three points; that is, at the locations of the pins 20. Heretofore, it has been the practice to affix the gear and rotor against relative movement at many more points. However, distortion of the gear at many points at elevated temperatures of the rotor resulted in excessive loads on the attaching means and gear, and such loads in combination with the cyclically varying operating loads on these parts, tended to cause the parts to fail. The structural integrity of the rotor and gear assembly of the invention is markedly improved by limiting the number of points at which the gear and rotor are secured against relative movement in planes perpendicular to the rotor and gear axes to that required substantially maintain the gear concentric to the rotor.

Cyclically varying loads on the three pins 20 are limited by piloting the gear 12 on the rotor 10 and providing a fit therebetween which, while loose at ambient temperatures, because tight at elevated temperatures of the rotor.

As shown, the gear 12 is piloted at cylindrical surfaces 31 of the bosses 22 and cylindrical surfaces 32 of the bosses 28 on cylindrical surface 34 of the rotor. When the rotor expands, the cylindrical surface 34 of the rotor tightens against the cylindrical surfaces 31, 32 of the bosses and thereafter load is transmitted through such contacting surfaces rather than solely through the pins 20.

Figure 5:
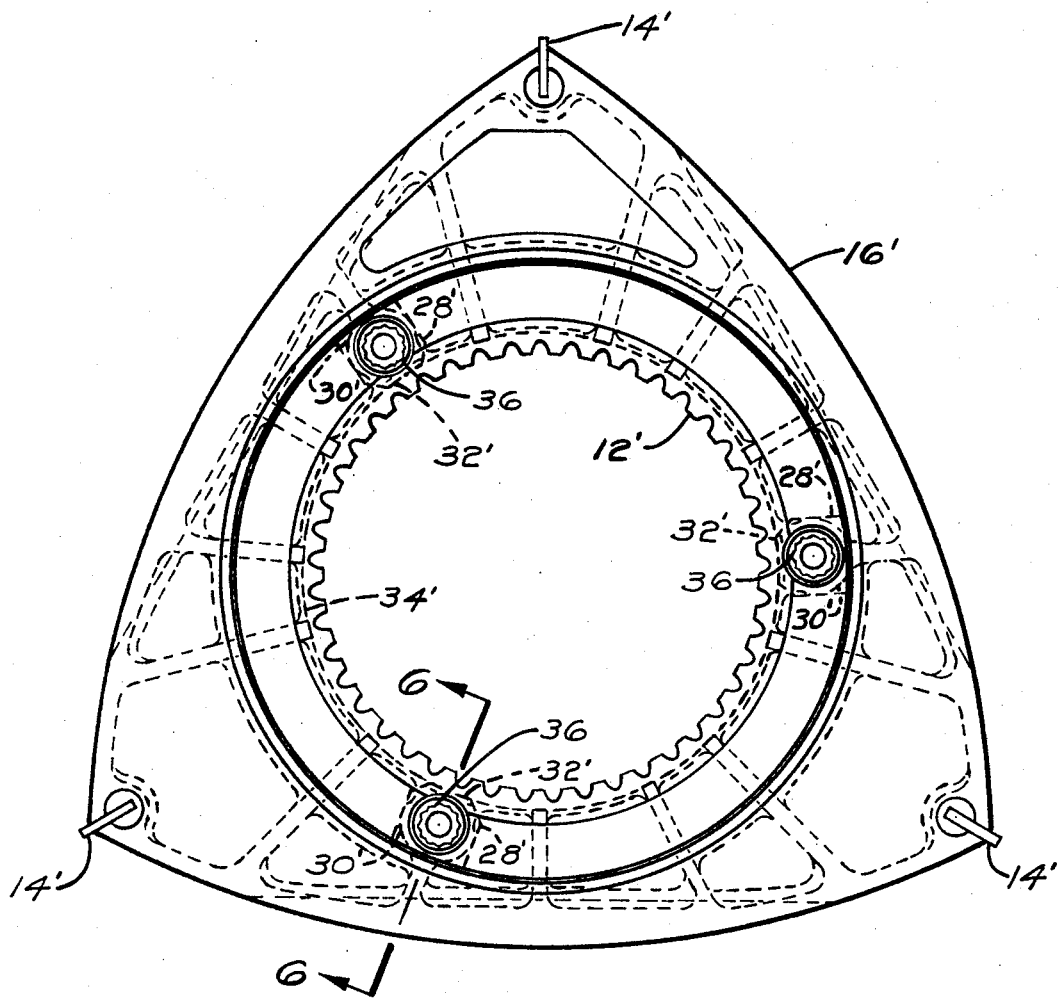
FIG. 5 is an end view of an alternate construction in accordance with the invention.

In a modified rotor and gear assembly according to the invention (FIGS. 5 and 6) wherein parts corresponding to parts of the assembly already described bear like reference characters but have a prime mark (') added thereto, the gear and rotor are held against relative axial movement and against relative movement due to thermal expansion in planes perpendicular to the rotor axis at the same locations to reduce the weight of the assembly and simplify the construction.

Equiangularly disposed bolts 36 hold the gear against the rotor to prevent the gear from moving axially relative to the rotor. As shown, such bolts project through bosses 28' on the gear and screw into the bosses 30' on the rotor to hold the gear against the rotor. Collars 38 tightly fitted into the bosses 28' of the gear and bosses 30' of the rotor assure that any thermal expansion of the rotor is imparted to the gear to maintain the gear substantially concentric to the rotor. The gear is piloted at cylindrical surfaces 32' of the bosses 28' on cylindrical surfaces 34' of the rotor, the fit between such surfaces being loose at ambient temperatures and tight at elevated temperatures such that at elevated temperatures, load may be transmitted through the contacting surfaces rather than solely through the collars 38.

While only two embodiments of the invention have been shown and described, it will be apparent to persons skilled in the art that other embodiments are possible and that various changes and modifications may be made in the assemblies disclosed without departing from the spirit or from the scope of the invention as defined in the annexed claims.

What is claimed is:

1. In a rotary mechanism, the combination comprising a rotor, a gear concentric to the rotor, and means securing the rotor and gear at selected locations against relative movement in planes perpendicular to the gear and rotor axes for maintaining the gear substantially concentric to the rotor upon distortion of the rotor with an increase in temperature, the gear and rotor having concentric cylindrical surfaces at which the gear is piloted over the rotor with a clearance between the piloting surfaces such that at operating temperatures of the rotor in the rotary mechanism, a tight fit is established between said surfaces of the rotor and gear due to thermal expansion of the rotor and cyclic operating loads are transmitted across such surfaces between the gear and rotor.

2. The combination of claim 1 wherein the gear is piloted over the rotor only at spaced locations therearound.

3. The combination of claim 1 including additional gear and rotor connecting means holding the gear and rotor in a fixed axially spaced relationship while permitting slight relative movement thereof radially.

4. The combination of claim 1 wherein the means physically connecting the rotor and gear for maintaining the gear substantially concentric to the rotor interconnect the gear and rotor at only three positions equally spaced one from the other around the gear and rotor.

5. The combination of claim 4 wherein said means are pins which are tightly fitted into the gear and rotor.

6. The combination of claim 4 including additional gear and rotor connecting means holding the gear and rotor in a fixed axially spaced relationship, and wherein the gear and rotor connecting means for maintaining the gear substantially concentric to the rotor and the additional gear and rotor connecting means are at the same locations.

7. The combination of claim 4 including additional gear and rotor connecting means holding the gear and rotor in a fixed axially spaced relationship and comprising a plurality of bolts which are equally spaced one from the other around the gear and rotor.

8. The combination of claim 7 wherein the bolts are three in number, and are equally spaced one from the other around the gear and rotor, and each of the bolts is located between two of the said three positions of the means connecting the gear and rotor for maintaining the gear substantially concentric to the rotor.

9. The combination of claim 7 wherein the means for maintaining the gear substantially concentric to the rotor are three sleeves, each of which is tightly fitted into the gear and rotor, and surrounds one of the said bolts.

References Cited

UNITED STATES PATENTS

| | | | |
|---|---|---|---|
| 3,216,405 | 11/1965 | Jungbluth | 123—8 |
| 3,260,247 | 7/1966 | Gassmann et al. | 123—8 |
| 3,295,754 | 1/1967 | Abermeth et al. | 123—8 X |
| 3,297,240 | 1/1967 | Tatsutomi | 230—145 |

FRED C. MATTERN, JR., *Primary Examiner.*

LEONARD H. GERIN, *Assistant Examiner.*